ADJUSTABLE TRIMMER BAR FOR BORING TYPE MINING MACHINE

Original Filed Aug. 1, 1956 3 Sheets-Sheet 1

INVENTOR
Edward L. Anderson
BY
Murray A. Gleeson
ATTORNEY

ADJUSTABLE TRIMMER BAR FOR BORING TYPE MINING MACHINE

Original Filed Aug. 1, 1956 3 Sheets-Sheet 2

INVENTOR.
Edward L. Anderson
BY
Murray A. Gleeson
ATTORNEY

ADJUSTABLE TRIMMER BAR FOR BORING TYPE MINING MACHINE

Original Filed Aug. 1, 1956 3 Sheets-Sheet 3

INVENTOR.
Edward L. Anderson
BY
Murray A. Gleeson
ATTORNEY

United States Patent Office

Re. 24,480
Reissued June 3, 1958

24,480

ADJUSTABLE TRIMMER BAR FOR BORING TYPE MINING MACHINE

Edward L. Anderson, Chicago, Ill., assignor to Goodman Manufacturing Company, Chicago, Ill., a corporation of Illinois Original No. 2,808,251, dated October 1, 1957, Serial No. 601,568, August 1, 1956. Application for reissue November 21, 1957, Serial No. 698,019

2 Claims. (Cl. 262—7)

Matter enclosed in heavy brackets [ ] appears in the original patent but forms no part of this reissue specification; matter printed in italics indicates the additions made by reissue.

This invention relates to improvements in mining machines of the boring type, wherein two or more boring heads are rotatable on parallel spaced axes to cut contiguous overlapping bores in advance of the machine, and auxiliary chain carrying cutter bars are disposed immediately behind the boring heads to cut off the cusps at floor and roof levels between the bores, so as to cut a generally rectangular bore.

In machines of the type above referred to, it has usually been the practice to provide means for adjusting the cutter bars vertically relative to the machine frame and the boring head to vary the height of the bore pattern, this adjustment being effected by a pair of hydraulic motors of the cylinder and piston type mounted on the machine frame and connected to the opposite ends of each of the cutter bars. The vertical movement of the cutter bars has been limited simply by the pistons coming to the ends of their cylinders.

In some instances it has also been the practice to mount the hydraulic cylinders on the frame by a series of vertically disposed bolts and bolt holes, arranged so that the cylinders can be adjusted vertically with respect to the frame, but still limiting the extension of the piston rods in the cylinders to the full stroke of said piston rods.

The principal object of the present invention is to provide an auxiliary means for limiting the extension of the cutter bar relative to the frame independently of the length of stroke of the pistons in the cylinders.

A further object of the invention is to provide an auxiliary stop means of the character above-mentioned capable of varying the amount of extension of the cutter bar in relatively minute increments.

A still further object of the invention is to provide an auxiliary stop means consisting of a pair of lengths of chain wherein one or more detachable links of the chains can be removed or inserted so as to afford variations in vertical extension of the cutter bar in relatively large increments equal to the length of a chain link.

Another object of the invention is to provide an auxiliary stop means consisting of flexible lengths of chain or the like which may extend vertically toward a generally horizontal surface of the frame and may thence pass over direction changing devices so that the ends of the chain may be readily accessible for adjustment adjacent an outer edge of the horizontal face of the frame.

Other objects and advantages of the invention will appear from time to time as the following description proceeds.

The invention may best be understood by referring to the accompanying drawings, in which—

Figure 1:
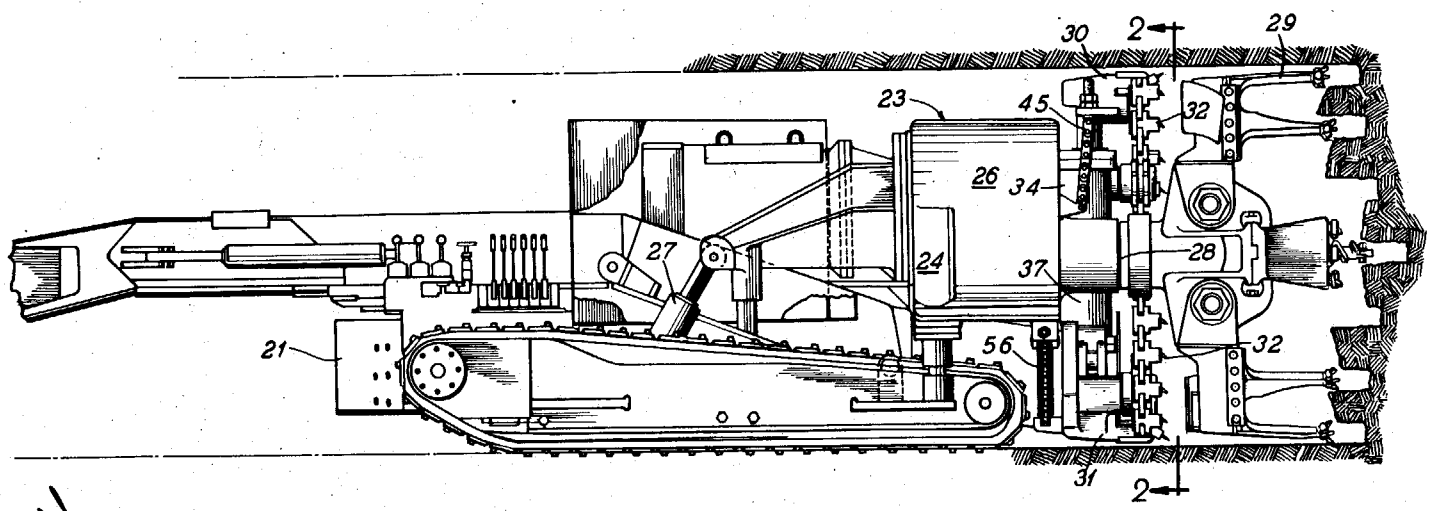
Figure 1 is a side view of a mining machine of the type to which the present invention is particularly applicable.

Referring now to details of the embodiment of the invention illustrated in the drawings, Figure 1 shows a mining machine of the type adapted to produce a pair of overlapping contiguous bores in a seam of coal or the like, and includes a main frame 21 mounted on crawler treads for propelling the machine along the mine floor. An auxiliary frame 23 is mounted on the front end of the main frame 21 and is arranged to be raised or lowered, as usual, by a pair of jacks 24, 24 on opposite sides of a gear casing 26. The auxiliary frame 23 is also arranged so that it may be tilted forwardly or rearwardly by a pair of rearwardly inclined jacks 27. The gear casing 26 has extending forwardly therefrom a pair of laterally spaced power-driven shafts 28 which support a pair of boring heads 29 arranged to rotate in timed relation to each other. The general arrangement of parts previously mentioned are substantially as described in Patent No. 2,765,154, so need not be more fully described herein, excepting as to the features which form parts of the present invention.

Figure 2:
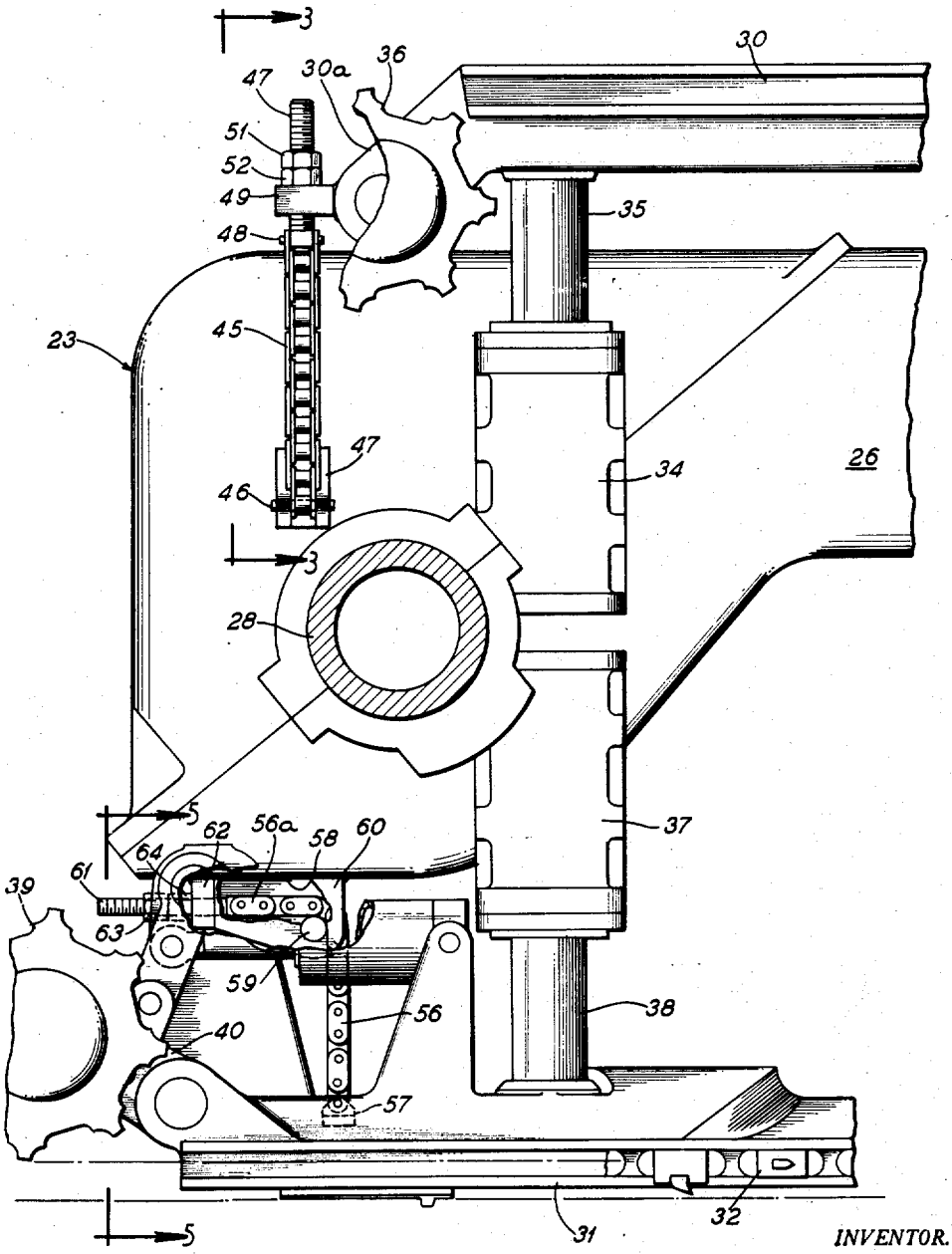
Figure 2 is an enlarged fragmentary section taken generally on line 2—2 of Figure 1, but with parts omitted to show details of the extension limiting means for the upper and lower cutter bars.

The machine has an upper cutter bar 30 and a lower cutter bar 31 mounted on the auxiliary frame 23 immediately behind the boring heads 29. These upper and lower cutter bars are disposed horizontally, and each have a cutter chain 32 guided therealong so as to remove the cusps left between the cutter heads at the roof and the floor of the mine, as is usual with machines of this type. The upper cutter bar 30 is vertically adjustable relative to the gear case 26 of auxiliary frame 23 by a hydraulic cylinder 34 fixed to the front face of the gear case 26 and having a piston rod 35 extending vertically therefrom and connected to the upper cutter bar 30 adjacent the outer end thereof, as shown in Figure 2. The opposite end of the upper cutter bar 30 is provided with a duplicate hydraulic cylinder 34 and piston 35 operable in unison with the cylinder and piston shown in Figure 2 for extending or retracting the upper cutter bar 30 bodily relative to the frame 23. A chain sprocket 36 may be mounted, as usual, on downwardly inclined end portions 30a of the upper cutter bar 30 so as to serve as direction changing devices for the cutter chain 32 in the usual manner.

The lower cutter bar 31 is similarly arranged for vertical extension relative to the auxiliary frame 23 by means of a pair of hydraulic cylinders 37 and pistons 38. In the form shown herein, the ends of the lower cutter bar 31 extend laterally to a somewhat greater length than the upper cutter bar 30 and have direction changing chain sprockets 39 carried on arms 40 pivotally connected to the ends of the lower cutter bar so as to permit the sprockets 39 to be swung upwardly and inwardly at certain times to aid in withdrawing the mining machine from the working face in a manner well known in the art, so that further description of the sprockets 39 and pivoted arms 40 need not be made.

Referring now more particularly to the novel features of the present invention as applied to the upper cutter bar 30, a length of chain 45 has its lower end fixed to a pin 46 in a bracket 47 secured to the front face of the gear case 26 of auxiliary frame 23 below the outer end of said cutter bar 30. This chain is disposed in a generally vertical direction and has a screw shaft 47 connected to its upper end by pivot pin 48. The screw shaft passes through a lug 49 fixed to the downwardly offset end portion 30a of the cutter bar, as shown in Figure 2. A set of lock nuts 51, 52 are threaded on the upper end of the screw shaft 47 in abutting engagement with the upper face of the lug 49 so as to permit adjustment of the effective length of the chain 45, which limits the amount of vertical extension of the upper cutter bar relative to the frame 23.

Figure 3:
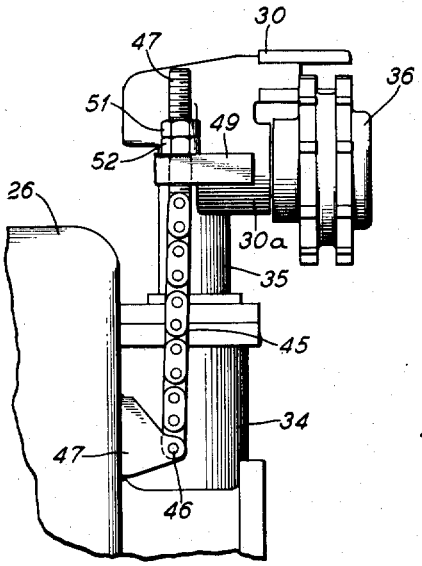
Figure 3 is an enlarged fragmentary section taken on line 3—3 of Figure 2 showing details of one of the upper flexible extension limiting chains.
Figure 4:
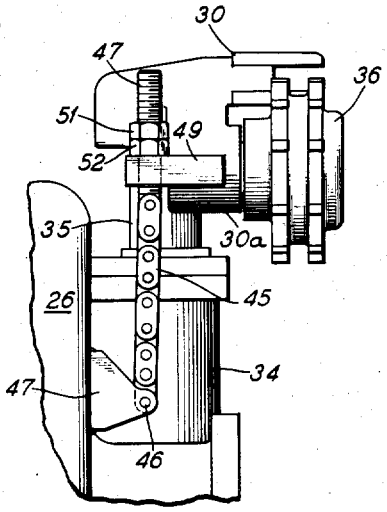
Figure 4 is a view similar to that shown in Figure 3, but with one of the chain links removed from the chain.

The length of chain 45 is made up of a plurality of conventional chain links, at least one of which links is detachable and may be removed or added when it is desired to vary the effective length of the chain 45. This difference in an effective length of the chain may be seen by reference to Figures 3 and 4. In the latter figure, one chain link has been removed so as to shorten the total length of the chain by the length of the link which has been removed. Accordingly, with the chain construction shown in Figures 2, 3 and 4, the amount to which the upper cutter bar can be extended vertically relative to the gear case 26 can be adjusted roughly by removing or adding one or more links to the chain, and a more precise adjustment can be afforded by changing the position of the lock nuts 51, 52 on the screw shafts 47.

Figure 5:
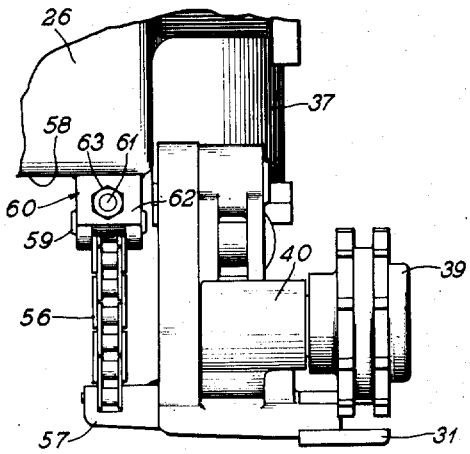
Figure 5 is a detail section taken on line 5—5 of Figure 2 showing details of one of the lower flexible limiting chains, together with the direction changing means associated therewith.

The means for limiting the extensible movement of the lower cutter bar 31, as shown in Figures 2 and 5, is essentially the same as previously described in connection with the limiting means for the upper cutter bar, excepting that in this instance the chain 56 is connected to a lug 57 on the lower cutter bar 31 and extends upwardly beneath an overhanging underface 58 of the gear case 26. In order to facilitate the adjustment of the length of the chain 56, a direction changing device, herein consisting of a horizontally disposed pin 59, is mounted at opposite ends in a lug 60 depending from the underface of the gear case 26, and the chain 56 is trained over said pin 59 so that a generally horizontal component 56a of said chain extends along said underface and has a screw shaft 61 connected to its outer end passing through a lug 62, also depending from the underface of the gear case. The lug 62 is disposed closely adjacent the side edge of the gear case, however, in position to permit ready access to a set of lock nuts 63, 64 threaded on the outer ends of the screw shaft 61, when it is desired to adjust the effective length of the chain 56.

It will be further understood that the length of the chain 56 can also be varied by removing one or more detachable links therefrom in the same manner as previously described in connection with the chain 45 associated with the upper cutter bar 30.

Although I have shown and described a certain embodiment of my invention it will be understood that various changes and modifications may be made without departing from the spirit and scope of the invention as defined by the appended claims.

I claim:

1. In a mining machine of the boring type having a mobile frame, a pair of laterally spaced boring heads rotatable on said frame for cutting contiguous bores in advance of the machine, a horizontally disposed chain carrying cutter bar on said frame rearwardly of and generally tangential to the circular paths of said boring heads for removing the cusps left between said heads and means including extensible fluid pressure motors for adjusting said cutter bar vertically relative to said boring heads, the improvement which comprises a flexible member having one end fixed to the frame for limiting the vertical adjustment of said cutter bar relative to said frame, the other end of said flexible member having a threaded extension, and the cutter bar having a lug through which said threaded member extends for endwise adjustment by a threaded nut.

[2. The structure of claim 1 wherein the frame has a horizontally disposed face toward which said flexible member extends, and a direction changing element is mounted on said face about which the flexible member is passed, and the end of the flexible member is adjustably connected to the frame adjacent the outer edge of said horizontal face.]

*3. In a mining machine of the boring type having a mobile frame, a pair of laterally spaced boring heads rotatable on said frame for cutting contiguous bores in advance of the machine, a horizontally disposed chain carrying cutter bar on said frame rearwardly of and generally tangential to the circular paths of said boring heads for removing the cusps left between said heads and means including extensible fluid pressure motors for adjusting said cutter bar vertically relative to said boring heads, the improvement which comprises a flexible member having one end fixed to the cutter bar, said frame having a horizontally disposed face spaced from said cutter bar and toward which said flexible member extends, a direction changing element mounted on said face about which said flexible member is passed, and an adjustable connection between said flexible member and said frame adjacent the outer edge of said horizontal face.*

References Cited in the file of this patent or the original patent

UNITED STATES PATENTS

| | | |
|---|---|---|
| 2,373,226 | Coates | Apr. 10, 1945 |
| 2,402,505 | Moore | June 18, 1946 |
| 2,684,641 | Warf | July 27, 1954 |
| 2,715,527 | Cartlidge et al. | Aug. 16, 1955 |